United States Patent
Glejbol et al.

(10) Patent No.: US 6,668,866 B2
(45) Date of Patent: Dec. 30, 2003

(54) FLEXIBLE, ARMOURED PIPE AND USE OF SAME

(75) Inventors: Kristian Glejbol, Glostrup (DK); Jakob Wedel-Heinen, Charlottenlund (DK)

(73) Assignee: NKT Flexibles I/S, Brondby (DK)

( * ) Notice: Subject to any disclaimer, the term of this patent is extended or adjusted under 35 U.S.C. 154(b) by 0 days.

(21) Appl. No.: 10/204,178

(22) PCT Filed: Jan. 11, 2001

(86) PCT No.: PCT/DK01/00016

§ 371 (c)(1),
(2), (4) Date: Nov. 13, 2002

(87) PCT Pub. No.: WO01/61231

PCT Pub. Date: Aug. 23, 2001

(65) Prior Publication Data

US 2003/0155029 A1 Aug. 21, 2003

(30) Foreign Application Priority Data

Feb. 16, 2000 (DK) ........................................ 2000 00241

(51) Int. Cl.⁷ ................................................ F16L 11/16
(52) U.S. Cl. ....................... 138/134; 138/148; 138/133; 138/138; 138/172
(58) Field of Search .................................. 138/134, 135, 138/149, 124, 130, 133, 131, 140, 137, 138, 174, 172

(56) References Cited

U.S. PATENT DOCUMENTS

| | | | |
|---|---|---|---|
| 4,402,346 A | 9/1983 | Cheetham et al. | 138/129 |
| 4,673,002 A | 6/1987 | Scanlon et al. | 138/149 |
| 5,176,179 A * | 1/1993 | Bournazel et al. | 138/130 |
| 5,269,349 A * | 12/1993 | Sugier et al. | 138/172 |
| 5,275,209 A * | 1/1994 | Sugier et al. | 138/135 |
| 5,307,842 A | 5/1994 | Lequeux | 138/149 |
| 5,406,984 A * | 4/1995 | Sugier et al. | 138/135 |
| 5,918,641 A * | 7/1999 | Hardy et al. | 138/132 |
| 5,934,335 A | 8/1999 | Hardy | 138/131 |
| 6,006,788 A * | 12/1999 | Jung et al. | 138/131 |
| 6,053,213 A * | 4/2000 | Jung et al. | 138/130 |
| 6,123,114 A * | 9/2000 | Seguin et al. | 138/124 |
| 6,145,546 A * | 11/2000 | Hardy et al. | 138/136 |
| 6,401,760 B2 * | 6/2002 | Espinasse | 138/135 |
| 6,408,891 B1 * | 6/2002 | Jung et al. | 138/127 |

FOREIGN PATENT DOCUMENTS

WO    WO 94/29634    12/1994

* cited by examiner

*Primary Examiner*—Patrick Brinson
(74) *Attorney, Agent, or Firm*—Kilpatrick Stockton LLP

(57) ABSTRACT

An armoured flexible pipe consists of an inner liner (3), on the inside of which a carcass (1) is provided, while the outer side of the inner liner is surrounded by a layer of pressure armour and a layer of tensile armour, which in turn are surrounded by one or more layers of thermally insulating bands which are shielded from the surroundings by an outer sheath. With the object of ensuring a sufficiently low transport of heat through the walls of the pipe, on the outside of the pressure and tensile armour layers (5, 6, 7, 8) thermally insulating bands are provided, which bands are made of a polymer or a polymeric composition, such as a polymer containing at least 50% polypropylene. The armoured flexible pipe according to the invention is especially advantageous for use in the extraction, transport or refining of mineral oil or related fluids.

6 Claims, 1 Drawing Sheet

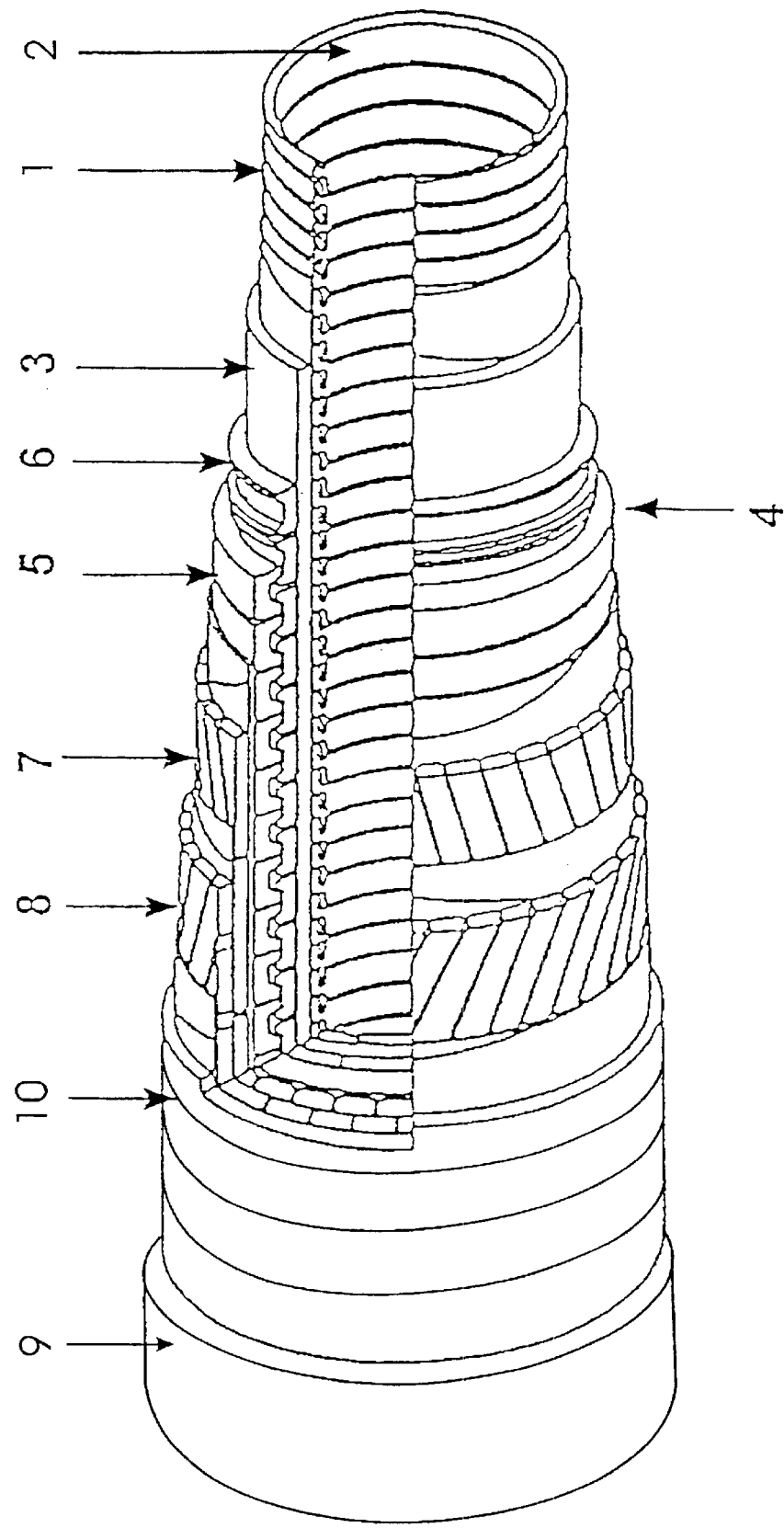

FLEXIBLE, ARMOURED PIPE AND USE OF SAME

The invention concerns an armoured flexible pipe comprising an inner liner which is provided on the inside with a carcass, while the outside of the inner liner is surrounded by a pressure armour and a tensile armour, which in turn is surrounded by one or more layers of thermally insulating bands which are shielded from the surroundings by an outer sheath.

The invention also concerns a use of the pipe.

Pipes of the above-mentioned type normally comprise an inner liner, which forms a barrier against the outflow of the fluid, which is conveyed through the pipe. The inner liner is wound with one or more armour layers which are not chemically bound to the inner liner but which can move in relation thereto, which ensures the flexibility of the pipe during laying out and operation.

Around the armour layers an outer sheath is provided with the object of forming a barrier against the ingress of fluids from the pipe surroundings to the armour layers. In order to prevent the collapse of the inner liner, this is often provided on the inner side with a flexible, wound pipe, a so-called carcass.

The above-mentioned type of flexible pipes is used, among other things, for the transport of fluids and gases in different depths of water. They are used especially in situations where very high or varying water pressure exists along the longitudinal axis of the pipe. As examples can be mentioned riser pipes which extend from the seabed up to an installation on or near the surface of the sea. Pipes of this type are also used between installations, which are located at great depths on the seabed, or between installations near the surface of the sea.

The armour layers, which are used as pressure armour, are most often constructed in such a way that they comprise different metallic profiles. When wound with a large angle in relation to the longitudinal axis of the pipe, these profiles will be able to absorb radial forces resulting from outer or inner pressure on the pipe. Among other things the profiles thus prevent the pipe from collapsing or exploding as a result of pressure, and are thus called pressure-resistant profiles.

Conversely, profiles, more specifically, tensile armour layers, which are wound with a small angle in relation to the longitudinal axis of the pipe, will not be able to absorb radial forces to any significant degree, but on the other hand are able to absorb forces exerted along the longitudinal axis of the pipe. Consequently, profiles of this type are known as tension-resistant profiles.

Together, the tension-resistant profiles and the pressure-resistant profiles form the armour for the pipe. In the armouring layer there also exists a free volume of such configuration that this can be ventilated, whereby a destructive build-up of pressure as a result of diffusion does not arise.

A problem in connection with the use of pipes of the type described above is that the transport of heat through the walls of the pipe can be quite considerable. With certain uses this is critical, since this type of pipe is often used to transport fluids, which are desired to be held at a temperature, which deviates from that of the surroundings. As an example of such a use can be mentioned that of transporting crude oil between two installations. If the temperature of the crude oil falls below a certain critical limit, mineral wax or solid hybrids can be formed in the pipe, which results in stoppages in the pipe.

In order to hold the transport of heat through the walls of the pipe at an acceptable level, it is known to wind one or more layers of bands made of a so-called syntactic foam on the outside of the pipe's tension-resistant armour, but on the inside of the outer sheath. This foam contains a great amount of filling material in the form of hollow glass balls, which have very great resistance against crushing, and a polymeric matrix material. Syntactic foam possesses a low heat conductivity coefficient, whereby the application of this material reduces the transport of heat through the walls of the pipe to an acceptable level.

However, the use of syntactic foam involves a number of limitations, the most important of which is that the mechanical strength of the foam often becomes that factor which limits the areas of application of the pipe. The syntactic foam thus possesses very great resistance against hydrostatic crushing, but only limited resistance against deformation and damage by local mechanical influences. A second problem connected with the use of syntactic foam is that the long-term characteristics of this material can be problematic to predict.

It is the object of the present invention to provide an armoured flexible pipe whereby a sufficiently low transport of heat through the walls of the pipe is ensured, and where there is no substantial addition of inorganic filling materials.

The object of the invention is achieved in that the thermally insulating bands are provided between the outer sheath and the tensile armour, and are made of a polymer or a polymeric mixture. It must further be noted that the use of polymers or polymeric mixtures for the bands involves a much cheaper and far easier processing of the bands than is the case with the use of e.g. syntactic foam.

Suitable compositions and dimensions of the thermally insulating bands are disclosed in the claims 2–4.

As mentioned, the invention also concerns a use of the pipe. This use is disclosed in more detail in claim 5.

The invention will now be described in more detail with reference to the drawing which comprises only one FIGURE, and which shows the construction of an armoured flexible pipe according to the invention with its various layers.

The FIGURE thus shows a pipe, which comprises an inner liner 3, which surrounds a carcass 1 consisting of a helically wound metal strip. This carcass forms an inner, permeable pipe of great mechanical strength. During manufacture, the metal strip 2 is formed with flaps, which engage with each other so that they hereby lock the individual windings of the metal strip 2 together in such a manner that the carcass 1 can be bent in its longitudinal direction.

Since the inner carcass 1 in itself is not impermeable, the purpose of the surrounding inner liner 3 is to prevent fluids from flowing into or out of the inside of the pipe. On the outside of the inner liner 3, one or several layers of profiles 5,6 are wound in a helical manner, said profiles forming windings with a large angle in relation to the longitudinal direction of the pipe. As a consequence of the large angle, the profiles are primarily able to absorb radial forces, which arise as a result of inner or outer pressure. The inner pressure arises during operation of the pipe. The outer pressure arises partly as a result of the hydrostatic pressure of the surroundings, and partly as a result of mechanical influences during the laying of the pipe. The windings thus form a pressure armour which prevents the inner liner 3 and the thermally insulating layers from exploding as a result of high pressure on the inside of the pipe, or from collapsing as a result of high pressure on the outside of the pipe.

From the FIGURE it will also be seen that a tensile armour consisting of one or several layers 7,8 being wound in a helical manner is provided on the outside of the pressure armour 5,6.

Between the pressure armour and the tensile armour an intermediate sheath (not shown in the FIGURE) can be provided, the function of which is to prevent fluids from migrating between the tensile armour and the pressure armour.

In order to increase the resistance against thermal transport transversely through the walls of the pipe, according to the invention on the outside of the armour layers a layer 10 can now be applied, said layer consisting of bands which are made of a homogenous material with low thermal transmission coefficient, such as a polymer or a polymeric composition. These layers are finally surrounded by an outer sheath 9.

Moreover, it should be noted that in addition to its thermally insulating characteristic, the thermally insulating layer must fulfil a number of other requirements, cf. below.

As a result of the outer pressure on the pipe, the outer sheath and the layer of thermally insulating band will be able to be pressed into the armour layer. If the thermally insulating layer is pressed out between the armouring strips, this will reduce the flexibility of the pipe to a considerable degree, with a possible destruction of the pipe as a consequence. Therefore, it is important that the thermally insulating layer possesses the necessary mechanical strength, so that it is not crushed or critically deformed during manufacture, laying-out and operation of the pipe.

In accordance with a particularly preferred embodiment, the thermally insulating bands disclosed here are made of a homogenous plastic material containing a minimum of 50-wt % polyolefin (PP).

In accordance with a second particularly preferred embodiment, the thermally insulating bands disclosed here are made of a homogenous plastic material containing a minimum of 50-wt % polyketones, such as e.g. Carilon produced by Shell.

What is claimed is:

1. Armoured flexible pipe comprising an inner liner (3), on the inside of which a carcass (1) is provided, while the outer side of the inner liner is surrounded by one or more layers of pressure (5,6) and tensile (7,8) armour, which in turn is surrounded by one or more layers of thermally insulating bands (10), which are shielded from the surroundings by an outer sheath (9), characterized in that the thermally insulating bands (10) are provided between the outer sheath (9) and the tensile armour (7,8), and are made of a polymer or a polymeric mixture.

2. Armoured flexible pipe comprising an inner liner (3), on the inside of which a carcass (1) is provided, while the outer side of the inner liner is surrounded by one or more layers of pressure (5,6) and tensile (7,8) armour, which in turn is surrounded by one or more layers of thermally insulating bands (10), which are shielded from the surroundings by an outer sheath (9), characterized in that the thermally insulating bands (10) are provided between the outer sheath, and in that the thermally insulating bands (10) are made of a polymer with a polyolefin content of at least 50%.

3. Armoured flexible pipe comprising an inner liner (3), on the inside of which a carcass (1) is provided, while the outer side of the inner liner is surrounded by one or more layers of pressure (5,6) and tensile (7,8) armour, which in turn is surrounded by one or more layers of thermally insulating bands (10), which are shielded from the surroundings by an outer sheath (9), characterized in that the thermally insulating bands (10) are provided between the outer sheath, and in that the thermally insulating bands (10) are made of a polymer with a polyketon content of at least 50%.

4. Armoured flexible pipe according to claim 1, characterized in that the breadth of the insulating bands lies in the interval 10–100 mm.

5. Use of an armoured pipe according to claim 1 for the extraction, transport or refining of mineral oil, gas or related fluids.

6. In an armoured flexible pipe of the type comprising an outer sheath forming a barrier against ingress of fluid from the pipe surroundings, and an inner liner forming a barrier against the outflow of fluid conveyed through the pipe, the inner liner being surrounded by one or more armour layers of metallic profiles which are not chemically bound to the inner liner but which can move in relation thereto, the improvement comprising thermally insulating bands of a polymer or a polymeric mixture provided between the armour layer or layers and the outer sheath, and in direct contact with at least one layer of the armour layer or layers.

* * * * *